United States Patent
Watanabe

(10) Patent No.: US 9,078,280 B2
(45) Date of Patent: Jul. 7, 2015

(54) WIRELESS COMMUNICATION SYSTEM, BASE STATION, AND WIRELESS COMMUNICATION SYSTEM CONTROL METHOD

(75) Inventor: Yoshikazu Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 403 days.

(21) Appl. No.: 13/518,366

(22) PCT Filed: Oct. 7, 2010

(86) PCT No.: PCT/JP2010/067681

§ 371 (c)(1),
(2), (4) Date: Aug. 8, 2012

(87) PCT Pub. No.: WO2011/077807

PCT Pub. Date: Jun. 30, 2011

(65) Prior Publication Data

US 2012/0300694 A1 Nov. 29, 2012

(30) Foreign Application Priority Data

Dec. 25, 2009 (JP) ................................. 2009-295153

(51) Int. Cl.
H04W 84/04 (2009.01)
H04W 16/32 (2009.01)
H04W 52/24 (2009.01)

(52) U.S. Cl.
CPC ............ *H04W 84/047* (2013.01); *H04W 16/32* (2013.01); *H04W 52/244* (2013.01)

(58) Field of Classification Search
CPC .. H04B 7/2606; H04B 7/155; H04B 7/15542; H04B 7/15507; H04W 84/047; H04W 40/22
See application file for complete search history.

(56) References Cited

U.S. PATENT DOCUMENTS

| 8,014,338 B2 | 9/2011 | Lee et al. |
| 8,160,589 B2 | 4/2012 | Kuwahara |

(Continued)

FOREIGN PATENT DOCUMENTS

| JP | 2008-118659 A | 5/2008 |
| JP | 2009-218638 A | 9/2009 |

(Continued)

OTHER PUBLICATIONS

International Search Report in PCT/JP2010/067681 dated Nov. 9, 2010 (English Translation Thereof).

(Continued)

*Primary Examiner* — Jung Park
(74) *Attorney, Agent, or Firm* — McGinn IP Law Group, PLLC

(57) ABSTRACT

A first communication station connects to a higher-order station or a lower-order station in a communication path of multi-hop wireless communication, and performs wireless communication with a mobile terminal in an access area in predetermined wireless resources that differs from a relay area used for wireless communication with the higher-order station or the lower-order station in the wireless resources. A second communication station that constitutes a communication path different from the foregoing communication path of multi-hop wireless communication and that can use wireless resources to perform wireless communication with a mobile terminal acquires information indicating the relay area in the wireless resources.

6 Claims, 14 Drawing Sheets

(56) References Cited

U.S. PATENT DOCUMENTS

| | | |
|---|---|---|
| 2007/0281613 A1 | 12/2007 | Lee et al. |
| 2008/0108355 A1 | 5/2008 | Oleszcsuk |
| 2008/0212516 A1* | 9/2008 | Son et al. ............... 370/315 |
| 2008/0220790 A1* | 9/2008 | Cai et al. ................ 455/450 |
| 2009/0016290 A1* | 1/2009 | Chion et al. ............ 370/329 |
| 2009/0253461 A1 | 10/2009 | Kuwahara |
| 2011/0019634 A1 | 1/2011 | Fujii et al. |
| 2011/0053495 A1 | 3/2011 | Hara et al. |
| 2011/0244788 A1 | 10/2011 | Ode et al. |
| 2013/0070662 A1* | 3/2013 | Bahceci et al. ......... 370/315 |

FOREIGN PATENT DOCUMENTS

| | | |
|---|---|---|
| JP | 2009-533943 A | 9/2009 |
| JP | 2009-225039 A | 10/2009 |
| JP | 2009-253569 A | 10/2009 |
| WO | 2007/120023 A1 | 10/2007 |
| WO | 2009/110332 A1 | 9/2009 |
| WO | 2009/154279 A1 | 12/2009 |
| WO | 2010/073403 A1 | 7/2010 |

OTHER PUBLICATIONS

IEEE Std 802.16m "Amendment to IEEE Standard for Local and Metropolitan Area Networks—Part 16: Air Interface for Broadband Wireless Access Systems—Advanced Air Interface" (Draft 3 (D3)) 16.4.11 Interference Avoidance and Interference Mitigation, Dec. 8, 2009.

Huawei, "LI Delay Impact on ICIC in type 1 Relay", 3GPP TSG RAN WG1 Meeting #57bis R1-092376, Jun. 29, 2009.

Qualcomm Europe, Operation of Relays in LTE-A, 3GPP TSG-RAN WG1 #55bis R1-090369, Jan. 12, 2008.

* cited by examiner

WIRELESS COMMUNICATION SYSTEM, BASE STATION, AND WIRELESS COMMUNICATION SYSTEM CONTROL METHOD

TECHNICAL FIELD

The present invention relates to a base station and to a wireless communication system that includes a relay station.

BACKGROUND ART

Multi-hop wireless communication systems are known as one type of wireless communication system. Communication realized by multi-hop is also referred to as communication by relay.

A multi-hop wireless communication system is a system in which one or a plurality of relay stations are disposed between base stations and mobile terminals of a wireless communication system for the purpose of extending coverage and increasing throughput as well as providing a countermeasure against silent zones. In a multi-hop wireless communication system, a packet from a base station to a mobile terminal is first transmitted from the base station to a relay station and then transmitted from the relay station to the mobile terminal. Similarly, a packet from a mobile terminal to a base station is first transmitted from the mobile terminal to a relay station and then transmitted from the relay station to the base station.

One method for realizing data relay by means of a multi-hop wireless communication system is a method of subjecting wireless frames to time-division in access zones and relay zones (relay areas). In an access zone, a base station and a relay station carry out communication with mobile terminals under the jurisdiction of each base station and each relay station, respectively. In a relay zone, on the other hand, a base station carries out communication with a relay station and mobile terminal that is under its jurisdiction, and a relay station carries out communication with a higher-order base station or relay station (higher-order station). When two or more relay stations are present between a base station and a mobile terminal, the relay station carries out communication with the relay station that is under its jurisdiction in a relay zone. Patent Document 1 gives an example of a multi-hop wireless communication system that is based on a WiMAX (Worldwide Interoperability for Microwave Access) system.

In recent years, femtocells are coming into use in wireless communication systems. A wireless communication system that is realized by femtocells provides wireless communication services by means of femto base stations for ranges that are narrower than cells (referred to as macrocells) that are provided by typical base station or relay station. A femto base station is installed outside macrocells or in sites in which macrocell radio waves are hard to reach such as, principally, in buildings, and is used for complementing wireless communication services realized by macrocells.

LITERATURE OF THE PRIOR ART

Patent Documents

Patent Document 1: Japanese Unexamined Patent Application Publication No. 2008-118659

Non-Patent Document

Non-Patent Document 1: IEEE Std 802.16m "Amendment to IEEE Standard for Local and Metropolitan Area Networks—Part 16: Air Interface for Broadband Wireless Access Systems—Advanced Air Interface" (Draft 3 (D3)) 16.4.11 Interference Avoidance and Interference Mitigation, Dec. 8, 2009.

SUMMARY OF THE INVENTION

A femto base station can be configured to provide wireless communication services using the same wireless frequency as surrounding macrocells. In the case of such a configuration, there is concern that interference will occur between macrocells and femtocells, resulting in a drop in service quality. IEEE 802.16m TG that investigates increasing the speed of WiMAX is at the stage of debating the reduction of interference of femtocells (see Non-Patent Document 1).

One cause of the occurrence of interference between macrocells and femtocells is that a macro base station and a femto base station each do not recognize the wireless resources that the other base station is using and therefore attempt to carry out different communication using the same wireless resources. However, when the macro base station is a relay station, the relay station does not carry out communication that will cause a lot of interference with any femto base station in the relay area.

It is an object of the present invention to provide a technology that enables taking into consideration the relay area in surrounding macrocells that is used by femto base stations in a wireless communication system.

The wireless communication system of the present invention for achieving the above-described object includes:

a first communication station that connects with a higher-order station or a lower-order station in a communication path in multi-hop wireless communication and that carries out wireless communication with a mobile terminal in an access area in predetermined wireless resources that differs from the relay area for wireless communication with the higher-order station or the lower-order station in the wireless resources; and a second communication station that constitutes a communication path differing from the communication path of the multi-hop wireless communication, that can use the wireless resources to carry out wireless communication with a mobile terminal, and that acquires information indicating the relay area in the wireless resources.

The base station of the present invention is a base station that connects with a higher-order station or a lower-order station in a communication path of multi-hop wireless communication, that forms a cell inside or in the vicinity of the cell of a communication station that performs wireless communication with a mobile terminal in an access area in predetermined wireless resources that differs from relay areas for wireless communication with the higher-order station or the lower-order station in the wireless resources, and that constitutes a communication path that differs from the communication path of the multi-hop wireless communication, the base station including:

wireless communication processing means that uses the wireless resources to carry out wireless communication with a mobile terminal; and control means that acquires information indicating the relay area in the wireless resources.

The wireless communication system control method of the present invention includes steps of:

a first communication station that connects with a higher-order station or a lower-order station in a communication path of multi-hop wireless communication performing wireless communication with a mobile terminal in an access area in predetermined wireless resources that differs from a relay area for performing wireless communication with the higher-order station or the lower-order station in the wireless resources; and a second communication station that constitutes a communication path that differs from the communication path of multi-hop wireless communication and that is capable of using the wireless resources to perform wireless communication with a mobile terminal acquiring information indicating the relay area in the wireless resources.

BEST MODE FOR CARRYING OUT THE INVENTION

Figure 1:
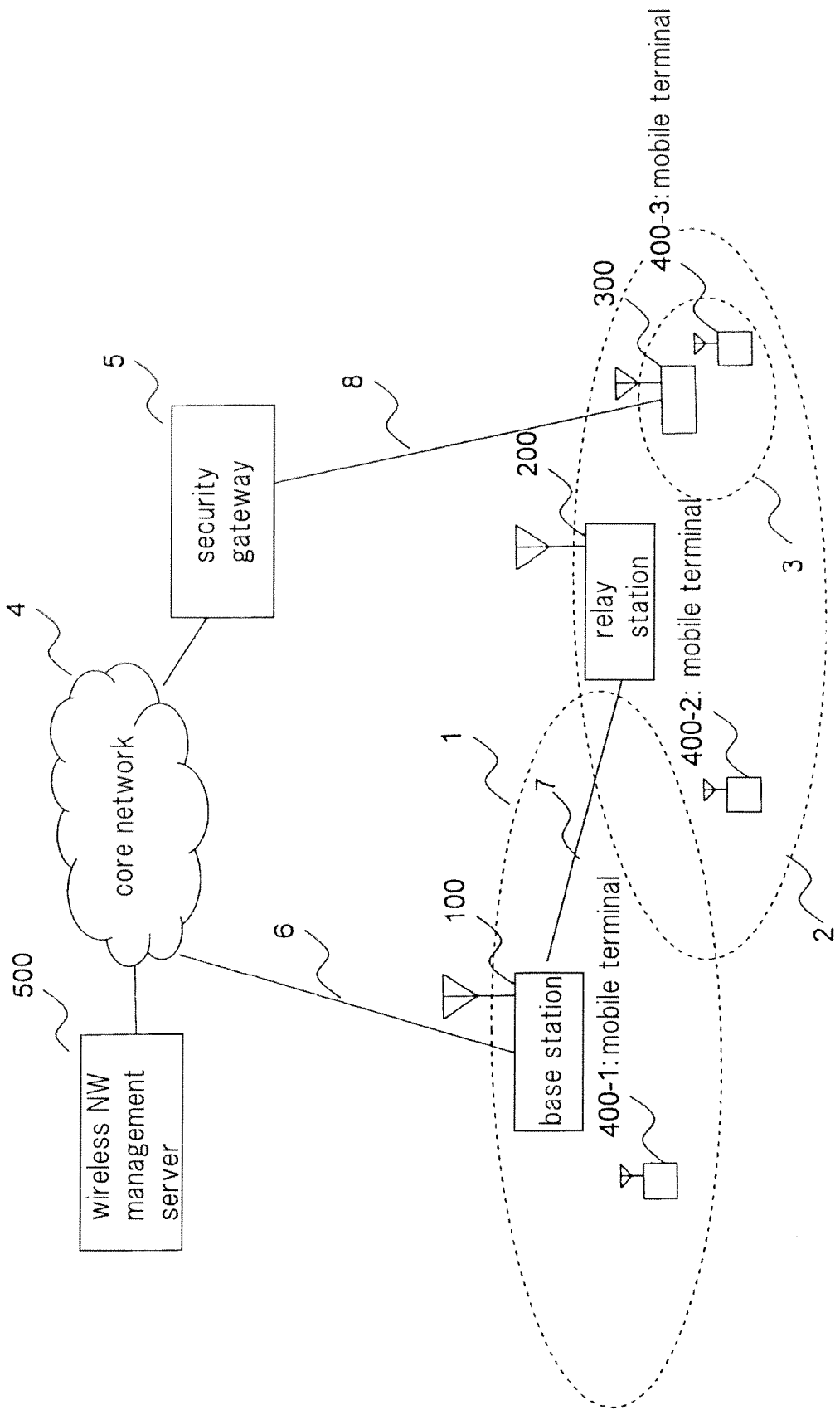
FIG. 1 shows the configuration of a wireless communication system that is realized by the first and second exemplary embodiments of the present invention.

Embodiments for carrying out the present invention are next described with reference to the accompanying drawings.

As the present exemplary embodiment, a WiMAX system based on the IEEE 802.16m standards for disposing a relay station between a base station and a mobile terminal to carry out multi-hop communication is shown by way of example.

A summary of the configuration and operations that are common to each exemplary embodiment of the present invention is first presented.

As an exemplary embodiment of the present invention, a WiMAX system is shown by way of example in which a relay station based on the standards of IEEE 802.16m is disposed between a mobile terminal that is based on the standards of IEEE 802.16m and a base station that is based on the standards of IEEE 802.16m to carry out multi-hop communication, and a femto base station based on the standards of IEEE 802.16m is disposed in the area of the relay station or base station. In the present exemplary embodiment, reference to a base station indicates a base station that is not a femto base station that forms a femtocell.

A WiMAX system that includes a base station, a relay station and a femto base station is basically a system according to the standards of IEEE 802.16m, and the functions for carrying out communication by the exemplary embodiments of the present invention are provided in a base station, a relay station and a femto base station.

In this system, the femto base station acquires information relating to the relay zones used by neighboring base stations and relay stations, whereby the femto base station is able to recognize the relay areas in which interference is less likely to occur compared to the access areas of neighboring base stations or relay stations and is thus capable of operations that take these relay areas into consideration. For example, if control is implemented to distinguish relay zones and access zones in which the degree of occurrence of interference differs, interference can be satisfactorily mitigated and the performance of the system can be improved.

For example, the preferential use of wireless resource areas that correspond to relay zones over wireless resource areas that correspond to access zones based on the information mitigates interference with macrocells in which surrounding base stations and relay stations are providing service. The preferential use by a femto base station of wireless resource areas that correspond to relay zones includes preferential scheduling and transmission power assignment to the areas.

When the technology described above is to be applied to an actual WiMAX system, various exemplary embodiments can be adopted. Several of these exemplary embodiments are described in detail hereinbelow with reference to the accompanying drawings.

First Exemplary Embodiment

The wireless communication system according to the first exemplary embodiment mitigates interference between macrocells and femtocells through the implementation by a femto base station of preferential assignment of wireless resources, which are used in communication with subordinate mobile terminals, to wireless resource areas that correspond to relay zones.

A first exemplary embodiment is first described.

FIG. 1 shows the configuration of a wireless communication system according to the first exemplary embodiment. Referring to FIG. 1, the wireless communication system includes base station 100, relay station 200, and femto base station 300. Base station 100, relay station 200, and femto base station 300 form macrocell 1, macrocell 2, and femtocell 3, respectively, and carry out bidirectional wireless communication with mobile terminal 400-1, mobile terminal 400-2, and mobile terminal 400-3, respectively.

The base station is also referred to as BS (Base Station) or ABS (Advanced Base Station). The relay station is also referred to as RS (Relay Station) or ARS (Advanced Relay Station). The mobile terminal is also referred to as MS (Mobile Station) or AMS (Advanced Mobile Station). The femto base station is also referred to as femto BS or femto ABS.

Core network 4 is a backbone network for a wireless communication system that is managed by a wireless communication provider. Base station 100 is connected to and communicates with core network 4 through communication line 6. Relay station 200 establishes wireless communication line 7 with base station 100 and communicates with core network 4 by way of base station 100. Security gateway 5 is a network device for establishing a safe communication route between core network 4 and femto base station 300 on a typical communication line. Security gateway 5 may be, for example, a VPN (Virtual Private Network) server. Femto base station 300 connects to and communicates with core network 4 by way of communication line 8 and security gateway 5.

Wireless NW (network) management server 500 is a server for managing the wireless communication system and is connected to core network 4, maintains the operational states of devices in the wireless communication system that includes base station 100, relay station 200, and femto base station 300, and determines operation parameters and notifies each device.

Figure 2:
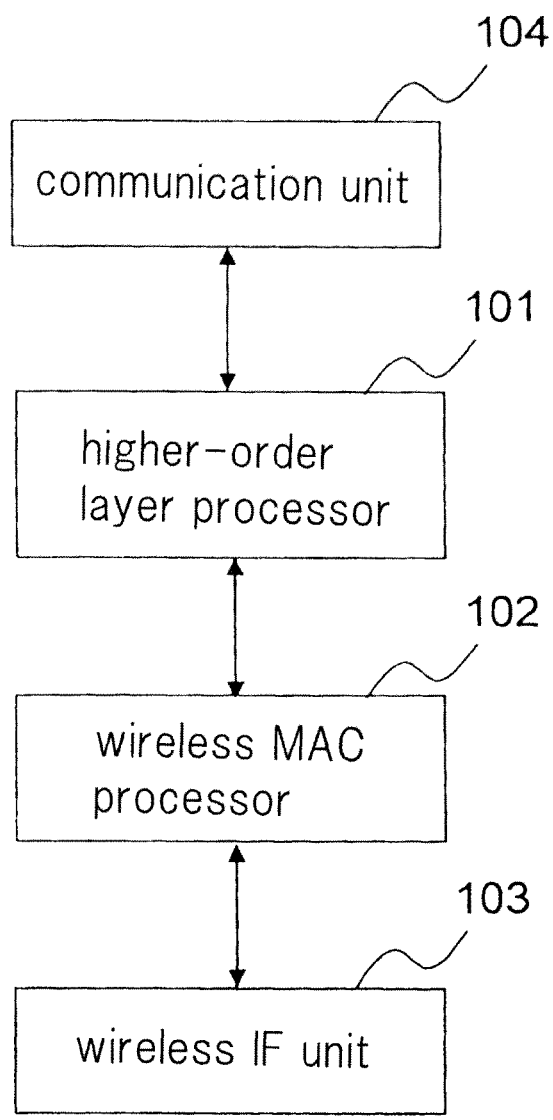
FIG. 2 is a block diagram showing the configuration of base station 100.

FIG. 2 is a block diagram showing the configuration of base station 100. Base station 100 is equipped with higher-order layer processor 101, wireless MAC processor 102, wireless IF unit 103, and communication unit 104.

Higher-order layer processor 101 carries out protocol processing of the higher-order layer communication that uses this wireless communication system. IP (Internet Protocol) can be offered as one example of the higher-order layer communication protocol. In addition, higher-order layer processor 101 carries out communication with wireless NW management server 500 and both reports the operational state of base station 100 to wireless NW management server 500 and receives operation parameters that are to be used by base station 100 from wireless NW management server 500.

Wireless MAC processor 102 carries out processing of the MAC (Media Access Control) layer of the base station that is prescribed by the standards of IEEE 802.16m. The MAC processing that is carried out by wireless MAC processor 102 includes scheduling, conversion from higher-order layer packets to MAC PDU (Payload Data Units) and reverse conversion, connection management, QoS (Quality of Service) control, route control, network entry processing, resending control, transmission queue management, data transfer processing with relay station 200, determination of settings of relay zones used in communication with relay station 200, and the like.

Wireless IF (interface) unit 103 carries out processing of the PHY (Physical) layer of a base station that is prescribed by the standards of IEEE 802.16m. Wireless IF unit 103 is connected to relay station 200 by way of wireless communication line 7 and carries out wireless communication with relay station 200. In addition, wireless IF unit 103 is connected to mobile terminal 400-1 in macrocell 1 and carries out wireless communication with mobile terminal 400-1.

Communication unit 104 is connected to core network 4 by way of communication line 6 and communicates with devices that are connected to core network 4.

Figure 3:
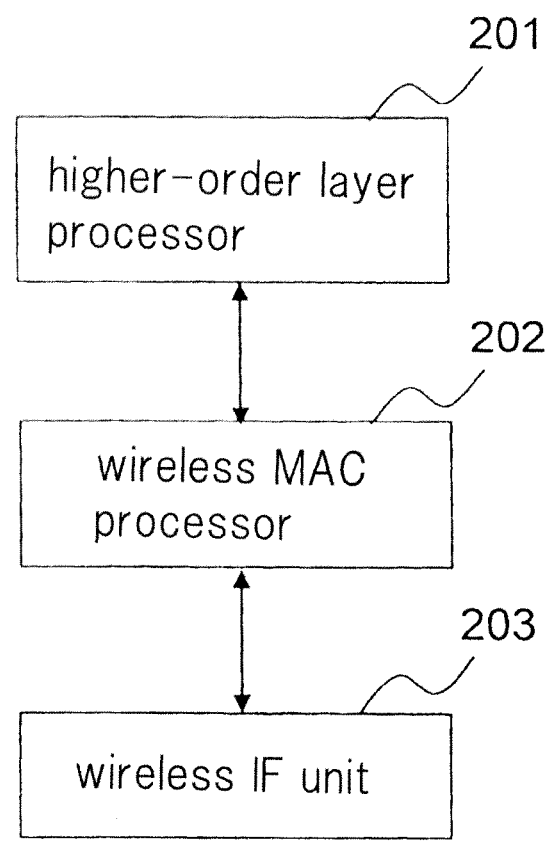
FIG. 3 is a block diagram showing the configuration of relay station 200.

FIG. 3 is a block diagram showing the configuration of relay station 200. Relay station 200 is equipped with higher-order layer processor 201, wireless MAC processor 202, and wireless IF unit 203.

Higher-order layer processor 201 carries out protocol processing of higher-order layer communication that uses this wireless communication system. In addition, higher-order layer processor 201 carries out communication with wireless NW management server 500, and both reports operational states of relay station 200 to wireless NW management server 500 and receives operation parameters to be used by relay station 200 from wireless NW management server 500.

Wireless MAC processor 202 carries out processing of the MAC layer of the relay station that is prescribed by the IEEE 802.16m standards. The MAC processing that is carried out by wireless MAC processor 202 includes scheduling, conversion from higher-order layer packets to MAC PDU and reverse conversion, connection management, QoS control, route control, network entry processing, resending control, transmission queue management, data transfer processing with base station 100, and the like.

Wireless IF unit 203 carries out PHY layer processing of the relay station that is prescribed by the IEEE 802.16m standards. Wireless IF unit 203 is connected to base station 100 by way of wireless communication line 7 and carries out wireless communication with base station 100. In addition, wireless IF unit 203 is connected to mobile terminal 400-2 in macrocell 2 and carries out wireless communication with mobile terminal 400-2.

Figure 4:
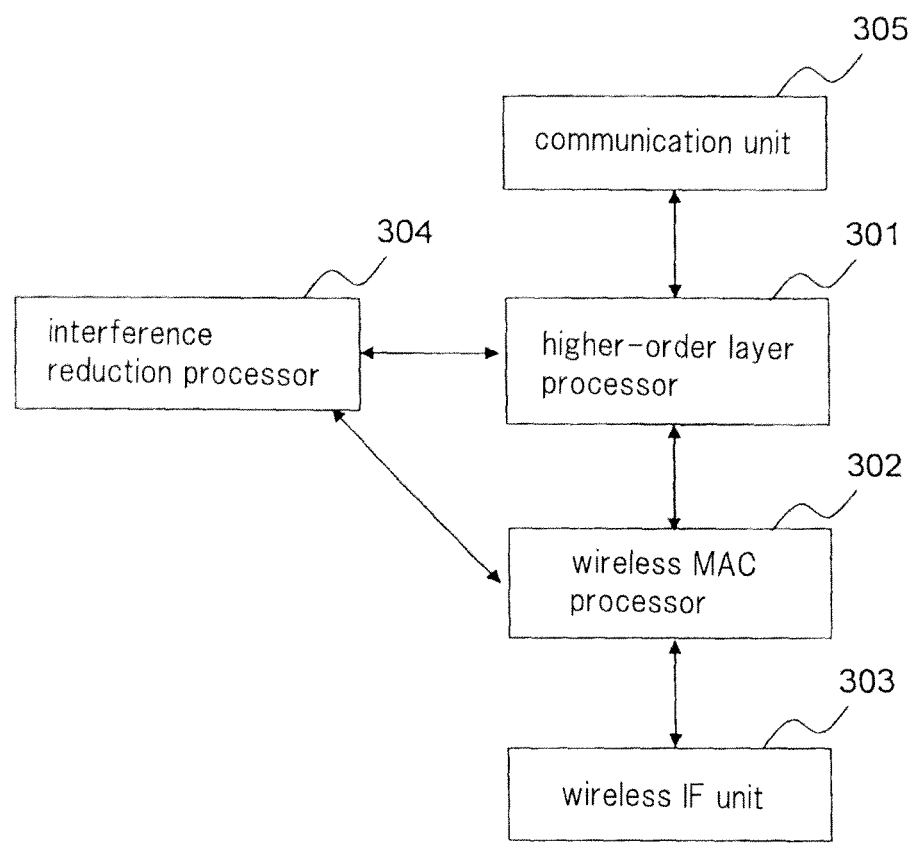
FIG. 4 shows the configuration of femto base station 300.

FIG. 4 is a block diagram showing the configuration of femto base station 300. Femto base station 300 is equipped with higher-order layer processor 301, wireless MAC processor 302, wireless IF unit 303, interference reduction processor 304, and communication unit 305.

Higher-order layer processor 301 carries out protocol processing of the higher-order layer communication that uses this wireless communication system. In addition, higher-order layer processor 301 is connected to security gateway 5 by way of communication line 8 and establishes a safe communication route with core network 4. Higher-order layer processor 301 further carries out communication with wireless NW management server 500 and both reports the operational state of femto base station 300 and receives operation parameters that are to be used by femto base station 300.

Wireless MAC processor 302 carries out processing of the MAC layer of the femto base station that is prescribed by the IEEE 802.16m standards. The MAC processing that is carried out by wireless MAC processor 302 includes scheduling, conversion from higher-order layer packets to MAC PDU and reverse conversion, connection management, QoS control, route control, network entry processing, resending control, and transmission queue management. Wireless MAC processor 302 further, based on information relating to relay zones of relay station 200 that interference reduction processor 304 holds, preferentially assigns wireless resources for communication with mobile terminal 400-3 to wireless resource areas that correspond to relay zones.

Wireless IF unit 303 carries out processing of the PHY layer of the femto base station that is prescribed by the IEEE 802.16m standards. Wireless IF unit 303 is connected to mobile terminal 400-3 in femtocell 3 and carries out wireless communication with mobile terminal 400-3.

Interference reduction processor 304 acquires and stores information relating to the relay zones being used by surrounding base stations and relay stations. In addition, based on this information, interference reduction processor 304 directs wireless MAC processor 302 to preferentially use wireless resource areas that correspond to relay zones.

Communication unit 305 is connected to core network 4 by way of communication line 8 and communicates with devices that are connected to core network 4.

Mobile terminals 400-1-3 are mobile terminals that conform to IEEE 802.16m standards. As a result, detailed description relating to mobile terminals 400-1-3 is here omitted. For example, mobile terminal 400-1 connects with base station 100 by wireless resources of an access zone or relay zone and carries out communication with a partner-side device by way of core network 4. Mobile terminal 400-2 connects with relay station 200 by wireless resources of an access zone. Mobile terminal 400-3 connects with femto base station 300.

Figure 5:
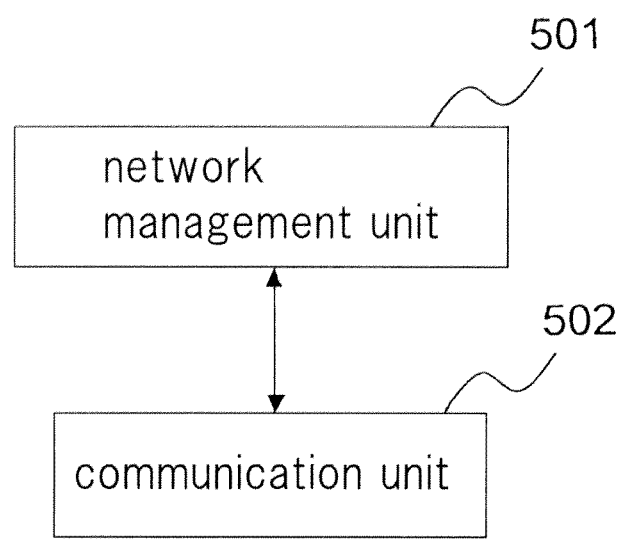
FIG. 5 shows the configuration of wireless NW management server 500.

FIG. 5 is a block diagram showing the configuration of wireless NW management server 500. Wireless NW management server 500 is equipped with network management unit 501 and communication unit 502.

Communication unit 502 is connected to core network 4 and communicates with base station 100, relay station 200, and femto base station 300 by way of core network 4.

Network management unit 501 acquires and holds the operational states of each station from base station 100, relay station 200, and femto base station 300 by communication that uses communication unit 502. In addition, by means of communication that uses communication unit 502, network management unit 501 determines as necessary the operation parameters to be used by base station 100, relay station 200, or femto base station 300 and reports these parameters to each station.

The operational states that are held by network management unit 501 include information of the relay zones used by base station 100 and relay station 200 and a list (neighboring station list) of base stations or relay stations in the vicinity of femto base station 300 (neighboring stations). In addition, network management unit 501 also reports information of neighboring stations of femto base station 300 to femto base station 300. This information includes information relating to relay zones that are being used by the neighboring stations. Femto base station 300 can learn from this information the relay zones that are being used by neighboring stations.

The configuration of wireless frames that are prescribed by the IEEE 802.16m standards and that are used by base station 100, relay station 200, and femto base station 300 are next described. The IEEE 802.16m standards use OFDMA (Orthogonal Frequency Division Multiple Access) as the multiple access method.

Figure 6:
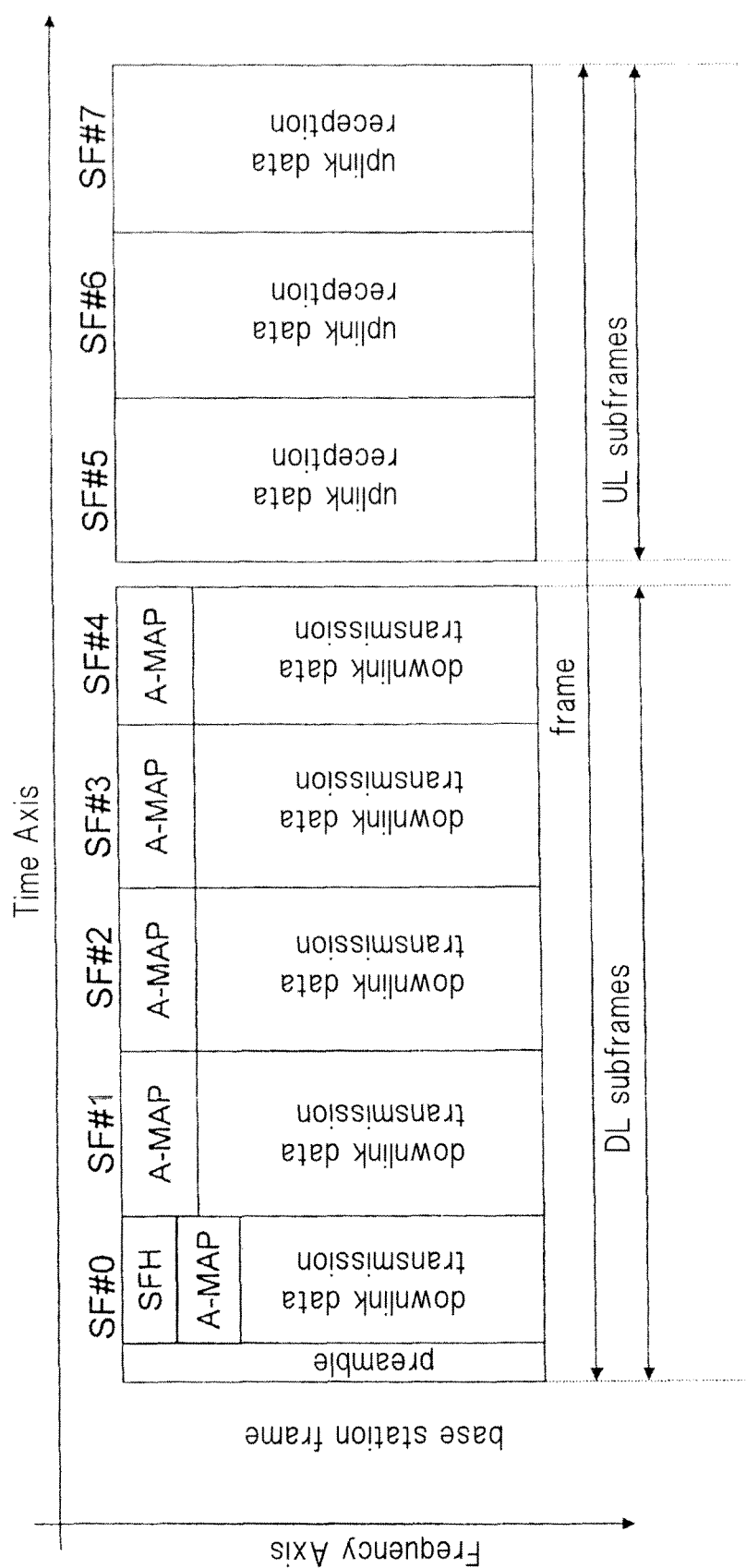
FIG. 6 shows an example of the wireless frame configuration that is used by a base station and femto base station in the IEEE 802.16m standards.

FIG. 6 is one example of the configuration of a wireless frame that is based on the IEEE 802.16m standards. The configuration of the frame shown in FIG. 6 is used by base stations and femto base stations. One wireless frame is 5 milliseconds long and is made up of eight subframes (SF).

FIG. 6 shows a case of TDD (Time Division Duplication) and the wireless frame is made up from DL (Down Link) subframes and UL (Up Link) subframes. A preamble is arranged in the first DL subframe, and a SFH (Super Frame Header) that includes system information such as the frame configuration for each four wireless frames is further arranged in this DL subframe. In addition, A-MAP (Advanced MAP) that includes control information is arranged in each DL subframe. A-MAP includes assignment information of the wireless resources in DL subframes and UL subframes. By referring to A-MAP, a mobile terminal learns whether downlink or uplink wireless resource assignment exists for its own station, and if there is an assignment, uses the designated wireless resources to carry out reception and transmission of data.

Figure 7:
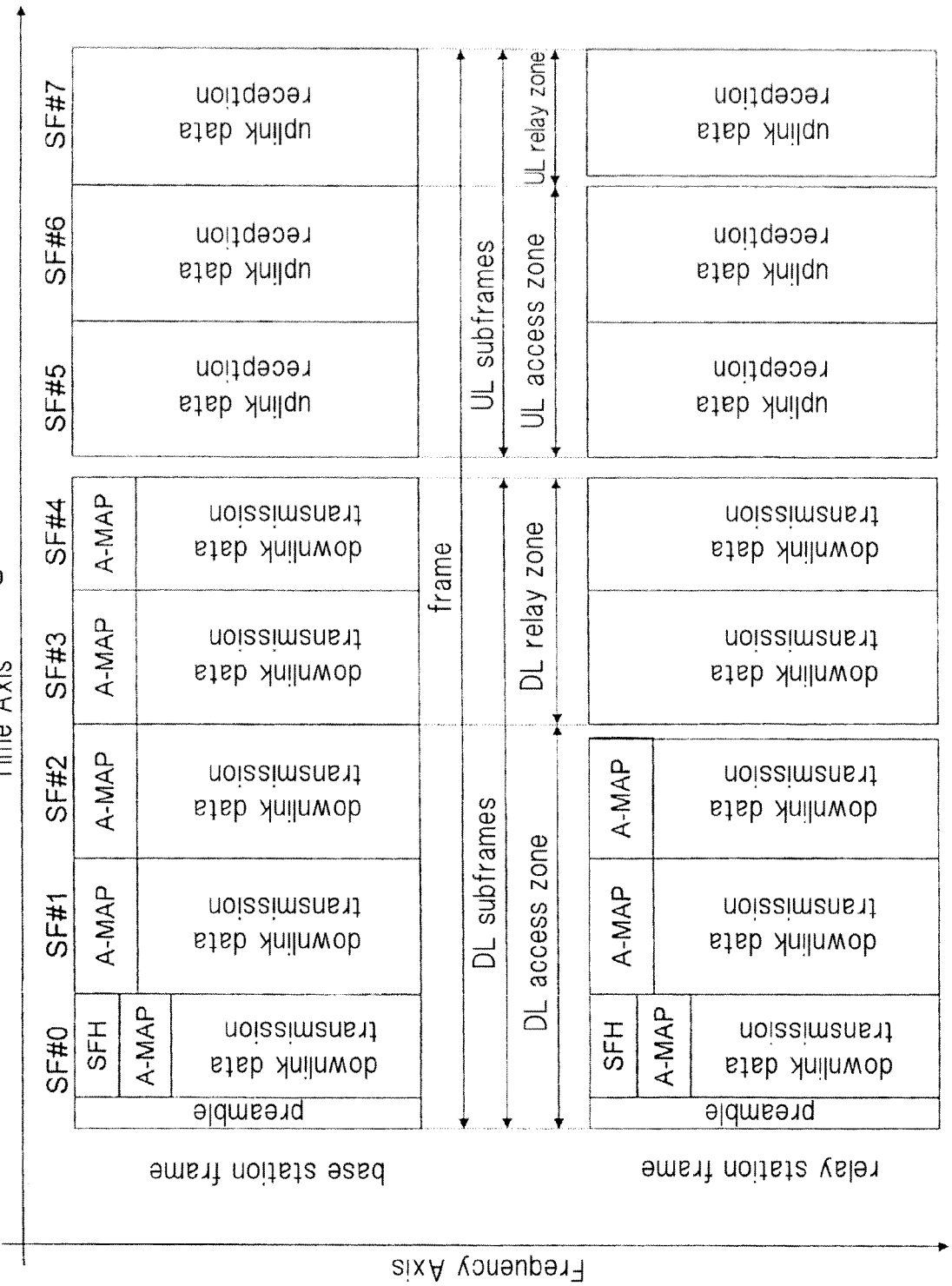
FIG. 7 shows an example of the wireless frame configuration that is used by a base station and relay station in the IEEE 802.16m standards.

FIG. 7 is an example of the configuration of a wireless frame for a relay station. When there are relay stations, areas referred to as relay zones are set in the wireless frame for communication by a relay station with a base station. In the example of FIG. 7, the last two DL subframes are used for the DL relay zone, and the last UL subframe is used for the UL relay zone. In a relay zone, a relay station behaves with respect to a base station similarly to a mobile terminal that is subordinate to the base station. In other words, in a DL relay zone, a relay station receives downlink data from the base station, and in an UL relay zone, a relay station transmits uplink data to the base station. Areas outside relay zones are referred to as access zones, and in an access zone, a relay station acts similar to a base station with respect to a mobile terminal that is subordinate to that relay station. The size and location of a relay zone of a relay station are determined by a base station and reported to a relay station using a control message. A base station may communicate with a relay station in a relay zone at the same time that it communicates with a mobile terminal that is subordinate to its own station.

Referring to FIGS. 8-11, the operations of the wireless communication system according to the first exemplary embodiment are next described.

Figure 8:
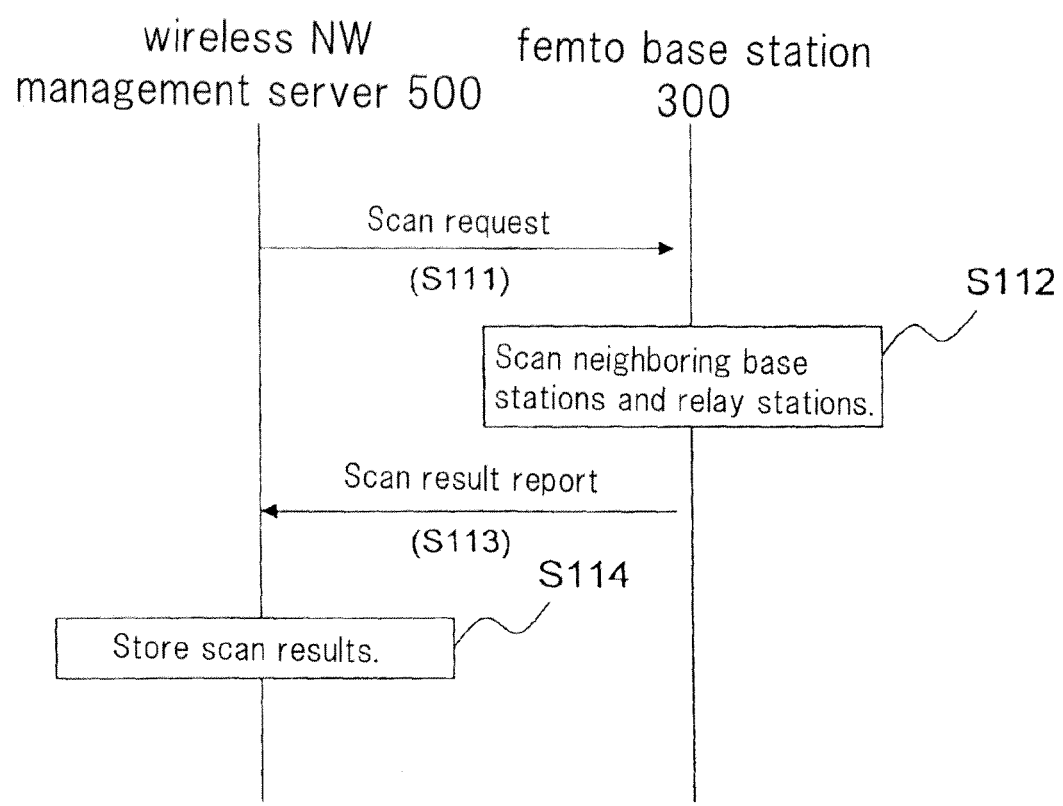
FIG. 8 is a sequence chart showing an example of the operations of the wireless communication system when wireless NW management server 500 creates the neighboring station list of femto base station 300 in the wireless communication system according to the first, second, and third exemplary embodiments.

First, referring to the sequence chart shown in FIG. 8, operations of the wireless communication system are described at the time that wireless NW management server 500 creates a neighboring station list of femto base station 300. These operations are carried out, for example, when femto base station 300 begins operation, when femto base station registers itself to wireless NW management server 500, when a change occurs in the settings of the relay zones of relay station 200, or when wireless NW management server 500 judges that updating of the list is necessary.

Network management unit 501 of wireless NW management server 500 transmits a message requesting scanning to femto base station 300 (Step S111). At this time, the request may include all or a portion of the following information:
the frequency band and frequency that are to be scanned
the set of preamble indices that are to be scanned
the types of stations to be scanned (all or a portion of the following)
base stations
relay stations
femto base stations
parameters to be measured (all or a portion of the following)
RSSI (Receive Signal Strength Indicator)
SINR (Signal-to-Interference-and-Noise Ratio)
CINR (Carrier-to-Interference-and-Noise Ratio)

Step S111 may be omitted and femto base station 300 may start the processes of Step S112 and the following steps spontaneously.

Wireless MAC processor 302 of femto base station 300 executes the scan of neighboring stations based on the message that was received in Step S111 (Step S112). The scan may employ the method prescribed by the IEEE 802.16m standards, or may employ another method.

Higher-order layer processor 301 of femto base station 300 receives the scan results from wireless MAC processor 302 and transmits these scan results to wireless NW management server 500 (Step S113). The scan results may include all or a portion of the following information:
identifiers of neighboring stations
preamble indices used by neighboring stations frequencies used by neighboring stations types of neighboring stations measurement results that take neighboring stations as objects Network management unit 501 of wireless NW management server 500 stores the scan result of femto base station 300 that was received in Step S113 as the neighboring station list of femto base station 300 (Step S114).

Next, the operations of a wireless communication system when the relay zones for relay station 200 are determined by base station 100 are described with reference to the sequence chart shown in FIG. 9. These operations are carried out, for example, when relay station 200 connects to base station 100 at the time of starting operation, or when base station 100 judges that a change of the relay zones is necessary.

Wireless MAC processor 102 of base station 100 determines the relay zones for relay station 200 (Step S121). At this time, wireless MAC processor 102 may determine the sizes of the relay zones while taking into consideration the number of users that are connected to base station 100 and relay station 200 and the load status of base station 100 and relay station 200.

Wireless MAC processor 102 of base station 100 reports the new settings of the relay zone to wireless MAC processor 202 of relay station 200 based on the IEEE 802.16m standards (Step S122).

Wireless MAC processor 202 of relay station 200, based on the relay zone settings that were received in Step S122, begins operations as a relay station that uses the IEEE 802.16m standards (Step S123). More specifically, relay station 200 communicates with higher-order base station 100 by the relay zones that were newly set and communicates with mobile terminal 400-2 by the newly set access zones.

Higher-order layer processor 101 of base station 100 transmits to wireless NW management server 500 the relay zone settings for relay station 200 that were determined in Step S121 (Step S124). At this time, the message that is transmitted may include all or a portion of the following information:

the identifier of relay station 200 the preamble index used by relay station 200 the DL access zone maximum transmission output of relay station 200 the DL access zone transmission output of relay station 200 the UL relay zone maximum transmission output of relay station 200 the UL relay zone transmission output of relay station 200 the size and location of the relay zones used by relay station 200 the R-TTI (Relay Transmit to Receive Transition Interval) used by relay station 200 the R-RTI (Relay Receive to Transmit Transition Interval) used by relay station 200 the identifier of the higher-order station (base station 100 in the present exemplary embodiment) to which relay station 200 is connected the preamble index used by the higher-order station (base station 100 in the present exemplary embodiment) to which relay station 200 is connected the DL access zone maximum transmission output of the higher-order station (base station 100 in the present exemplary embodiment) to which relay station 200 is connected the DL access zone transmission output of the higher-order station (base station 100 in the present exemplary embodiment) to which relay station 200 is connected the DL relay zone maximum transmission output of the higher-order station (base station 100 in the present exemplary embodiment) to which relay station 200 is connected the DL relay zone transmission output of the higher-order station (base station 100 in the present exemplary embodiment) to which relay station 200 is connected Network management unit 501 of wireless NW management server 500 stores the information that was reported in Step S124 (Step S125).

Figure 10:
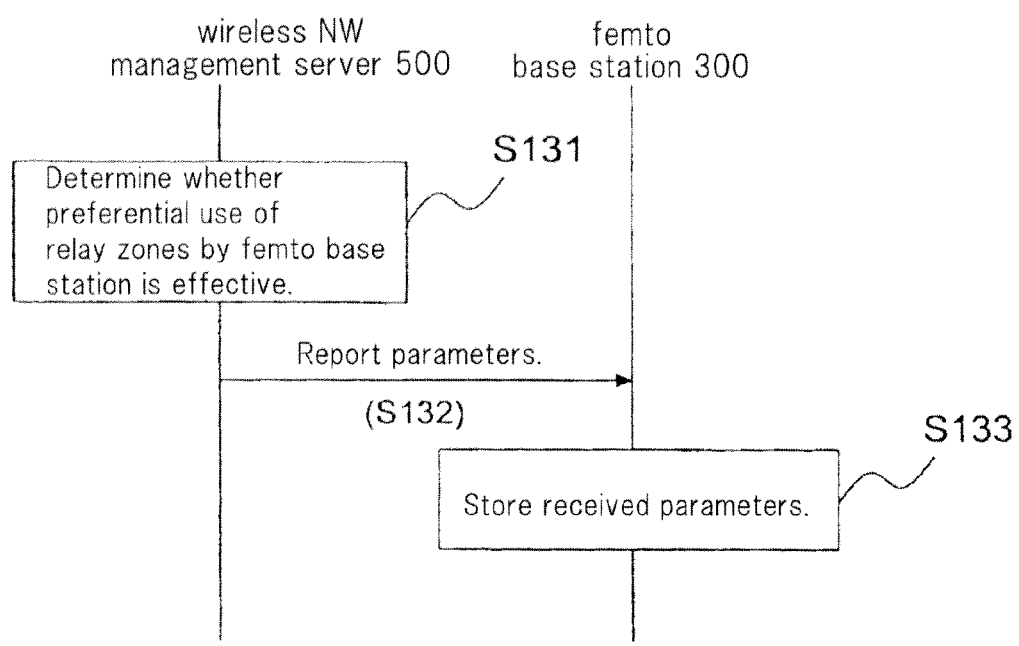
FIG. 10 is a sequence chart showing an example of the operations of the wireless communication system when wireless NW management server 500 reports to femto base station 300 information relating to the relay zone of relay station 200 of femto base station 300 in the wireless communication system according to the first and third exemplary embodiments.

Next, referring to the sequence chart shown in FIG. 10, the operations of the wireless communication system, when wireless NW management server 500 reports to femto base station 300 information relating to the relay zones of neighboring stations (relay station 200 in the case of the present exemplary embodiment) of femto base station 300, are described. These operations are carried out, for example, when the relay zone for relay station 200 is determined by base station 100, when wireless NW management server 500 creates the neighboring station list of femto base station 300, or when wireless NW management server 500 judges that this information must be reported to femto base station 300.

Network management unit 501 of wireless NW management server 500 judges whether the preferential use of relay zones by femto base station 300 is effective (Step S131). As an example of this method of judging, network management unit 501 may judge that the preferential use of relay zones by femto base station 300 is effective when a relay station (this corresponds to relay station 200 in the present exemplary embodiment) that uses relay zones is included in the neighboring station list of femto base station 300. Alternatively, as an example of another judging method, network management unit 501 may judge that the preferential use of relay zones by femto base station 300 is effective when a relay station that is using relay zones is included in the scan results of femto base station 300, and moreover, when any one or both of the RSSI and SINR of relay station 200 exceeds or falls short of a threshold value that has been set in advance in femto base station 300.

Upon judging that the preferential use of relay zones by femto base station 300 is effective in Step S131, network management unit 501 of wireless NW management server 500 transmits parameters relating to the relay zones of neighboring stations to femto base station 300 (Step S132). The parameters that are transmitted to femto base station 300 may include all or a portion of the information that was stored in Step S125 relating to neighboring stations. When there is a plurality of base stations or relay stations using relay zones in the neighboring station list of femto base station 300, the parameters relating to relay zones that are transmitted to femto base station 300 may be the sum or may be the product of the relay zones of this plurality of stations. In addition, these parameters may be transmitted not only to femto base station 300, but also to either one or both of base station 100 and relay station 200.

Interference reduction processor 304 of femto base station 300 stores the parameters that were reported in Step S132 (Step S133). At this time, interference reduction processor 304 reports to wireless MAC processor 302 that the relay zones of neighboring stations have been changed.

The operations of femto base station 300 when femto base station 300 implements wireless resource assignment for communication to mobile terminal 400-3 are next described with reference to FIG. 11. These operations are carried out by femto base station 300 for the wireless resource assignment (scheduling) of each wireless frame. The operations here described can be applied to downlink or uplink communication. The assignment of wireless resources for downlink communication is here described by way of example.

Wireless MAC processor 302 of femto base station 300 checks whether there are unscheduled data addressed to mobile terminal 400-3, i.e., data that have not been assigned wireless resources (Step S141). If there are no such data, wireless MAC processor 302 ends the process. Data in this case is information that consumes wireless resources to be delivered to mobile terminal 400-3, such data including IP (Information Elements) that include control information, data MAC PDU that includes user data, and control MAC PDU that includes control messages.

When there are unscheduled data in Step S141, wireless MAC processor 302 selects data that are to be the object of scheduling (Step S142). The data that are here selected are referred to as scheduling target data.

Wireless MAC processor 302 next checks whether there are vacant wireless resources that can be assigned to the scheduling target data among the subframes that correspond to the DL relay zones of relay station 200 (Step S143). At this time, wireless MAC processor 302 acquires the size and location of relay zones of relay station 200 from interference reduction processor 304 and specifies subframes that correspond to DL relay zones.

When there are vacant resources in Step S143, wireless MAC processor 302 assigns the vacant resources in subframes that correspond to the DL relay zones of relay station 200 to the scheduling target data (Step S144).

When there are no vacant resources in Step S143, wireless MAC processor 302 checks whether there are vacant resources that can be assigned to the scheduling target data in subframes that correspond to DL access zones of relay station 200 (Step S145).

When there are vacant resources in Step S145, wireless MAC processor 302 assigns the vacant resources in subframes that correspond to DL access zones of relay station 200 to the scheduling target data (Step S146).

When there are no vacant resources in Step S145, wireless MAC processor 302 judges that the scheduling target data cannot be scheduled to the current wireless frame (Step S147).

After executing Step S144, Step S146, and Step S147, wireless MAC processor 302 repeats the process of Step S141.

As described hereinabove, by means of the wireless communication system according to the first exemplary embodiment, femto base station 300 acquires setting information of relay zones that are used by relay station 200 that is a neighboring station and preferentially uses the wireless resources of subframes that correspond to the relay zones indicated in the setting information in communication with mobile terminal 400-3. Accordingly, interference between macrocell 1 due to base station 100, macrocell 2 due to relay station 200, and femtocell 3 due to femto base station 300 can be mitigated.

This effect is obtained because in DL relay zones, relay station 200 is receiving data from base station 100 and therefore does not communicate with mobile terminal 400-2, whereby there is no occurrence of interference with communication between femto base station 300 and mobile terminal 400-3 and with communication between relay station 200 and mobile terminal 400-2.

This effect is also obtained because, similarly, in UL relay zones, relay station 200 is transmitting data to base station 100 and therefore does not communicate with mobile terminal 400-2, whereby interference does not occur with communication between femto base station 300 and mobile terminal 400-3 and with communication between relay station 200 and mobile terminal 400-2.

In addition, even if subframes that correspond to access zones are used in communication between femto base station 300 and mobile terminal 400-3, the amount of wireless resources that are used in subframes that correspond to access zones is less than the amount of resources that is used for a case in which subframes corresponding to relay zones are not used preferentially, whereby interference in subframes that correspond to access zones can be reduced.

As the wireless communication system according to the first exemplary embodiment, an example has been shown in which there is one mobile terminal for each of base station 100, the relay station, and femto base station 300, but the present invention is not limited to this form. The number of mobile terminals that are connected to each of base station 100, relay station 200, and femto base station 300 may be different for each component, or the number may be "0" or two or more.

Although a wireless communication system has been shown in which there is one relay station 200, i.e., there are two hops from base station 100 to a mobile terminal, as an example of the wireless communication system according to the first exemplary embodiment, the present invention is not limited to this form. There may be a plurality of relay stations 200, i.e., there may be three or more hops from base station 100 to a mobile terminal.

Although, as the wireless communication system according to the first exemplary embodiment, an example has been shown in which scan results by femto base station 300 are used in the determination of whether the preferential use by femto base station 300 of the relay zones of neighboring base station 100 and relay station 200 is effective, the present invention is not limited to this form. As another example, the geographical information of base station 100, relay station 200, and femto base station 300 may also be used. As geographical information, the latitude, longitude, and altitude of each station may be used. Still further, information regarding outdoor installation or indoor installation, or information regarding attenuation due to the building when installation is indoors may also be used. Wireless NW management server 500 may calculate the distances between femto base station 300 and each of base station 100 and relay station 200 based on the geographical information and then compare these values with a threshold value to judge whether the preferential use of relay zones by the femto base station is effective.

Still further, wireless NW management server 500 may calculate the propagation loss or amount of interference between femto base station 300 and each of base station 100 and relay station 200 based on the geographical information and then compare these values with a threshold value. The threshold value may be given to wireless NW management server 500 beforehand, or may be calculated automatically based on information collected from within the wireless communication system. The geographical information may be given to wireless NW management server 500 by a system manager or wireless NW management server 500 may still automatically acquire the geographical information.

A GPS (Global Positioning System) may be used in the automatic acquisition of, for example, latitude. These items of information may be set in each station and reported to wireless NW management server 500 by way of core network 4, or may be set in wireless NW management server 500 in advance.

As the wireless communication system according to the first exemplary embodiment, an example was shown in which scan results by femto base station 300 are used in the determination of whether the preferential use by femto base station 300 of the relay zones of neighboring base station 100 and relay station 200 is effective, but the present invention is not limited to this form. As another example, the type or performance of the antenna used by neighboring relay station 200 in relay zones may also be used as a determination standard. Examples of the type of antenna include omni-antennas, directional antennas, and sector antennas. In addition, examples of the performance of an antenna include gain or directivity. For example, wireless NW management server 500 may determine that the preferential use of relay zones by femto base station 300 is effective only when relay station 200 in the vicinity of femto base station 300 is using an antenna having strong directivity in communication with base station 100 in relay zones. Alternatively, wireless NW management server 500 may use the geographical information combined with information of the antennas used by relay station 200 to estimate the amount of interference in relay zones between relay station 200 and femto base station 300 and then determine whether the preferential use of relay zones by femto base station 300 is effective based on the estimation result.

As the wireless communication system according to the first exemplary embodiment, an example was described in which wireless NW management server 500 performs the determination of whether the preferential use by femto base station 300 of relay zones of neighboring base station 100 and relay station 200 is effective. However, the present invention is not limited to this form. As another example, any of base station 100, relay station 200, and femto base station 300 may carry out this determination, or the processing may be shared among a plurality of devices. This form can be realized by communicating the information necessary for the determination among each of the devices.

Still further, as another example, the determination may be carried out by a femto-gateway (not shown) that is a device that performs management of femto base station 300. This determination can be realized by providing the functions of network management unit 501 of wireless NW management server 500 in the femto-gateway and then communicating information necessary for the determination among the femto-gateway and each of the devices. Femto base station 300 may acquire information relating to the relay zones of neighboring base station 100 and relay station 200 from the femto-gateway.

In the wireless communication system shown by way of example in the first exemplary embodiment, special conditions were not set in the selection of scheduling target data in Step S142 when femto base station 300 assigns wireless resources for communication to mobile terminal 400-3. However, the present invention is not limited to this form. As another example, preferences may be given for each type of data, and scheduling target data may be selected in accordance with these preferences. For example, when selecting scheduling target data in Step S142, wireless MAC processor 302 of femto base station 300 may preferentially select control MAC PDU or IE.

As the wireless communication system according to the first exemplary embodiment, an example was shown in which, when femto base station 300 assigns wireless resources for communication to mobile terminal 400-3, subframes that correspond to access zones are assigned if subframes that correspond to relay zones are not assigned. However, the present invention is not limited to this form. As another example, the scheduling of scheduling target data that are being processed can be determined to be impossible in wireless frames that are currently being processed if wireless resources of subframes that correspond to relay zones are not assigned to mobile terminal 400-3.

As the wireless communication system according to the first exemplary embodiment, an example was shown in which communication between femto base station 300 and wireless NW management server 500 is carried out by communication line 8 that is connected to core network 4 by way of security gateway 5, but the present invention is not limited to this form.

As another example, femto base station 300 may establish a wireless communication link with base station 100 or relay station 200 and perform communication with wireless NW management server 500 by way of this wireless communication link. This form can be realized by femto base station 300 temporarily halting communication with mobile terminal 400-3 and during this interval, performing communication with base station 100 or relay station 200. At this time, femto base station 300 may acquire information relating to base station 100 and relay station 200 directly from base station 100 and relay station 200 and not from wireless NW management server 500. This information includes information of the relay zones for relay station 200. In addition, in order to determine whether this information should be acquired from neighboring stations, femto base station 300 may determine whether the neighboring stations are base stations or relay stations, and if the neighboring stations are relay stations, may acquire the information of relay zones from these relay stations. To enable determining whether the neighboring stations are base stations or relay stations, base station 100 and relay station 200 may each report the type of its own station. Otherwise, femto base station 300 may judge the type of the neighboring stations based on the identifiers of the neighboring stations or the preamble index used by the neighboring stations.

As the wireless communication system according to the first exemplary embodiment, an example has been described in which femto base station 300 is the station that reduces interference by preferentially using subframes that correspond to the relay zones of neighboring base stations and relay stations, but the present invention is not limited to this form. As another example, base station 100-2 (not shown) that forms another macrocell in the vicinity of macrocell 1 or macrocell 2, and moreover, that does not have a relay station under its jurisdiction may carry out operations for reducing interference according to the present invention. This effect can be realized if base station 100-2 is provided with functions that correspond to interference reduction processor 304 of femto base station 300 and if base station 100-2 performs the operations of femto base station 300 that were described using FIGS. 8-11.

As the wireless communication system according to the first exemplary embodiment, an example was described in which the size of the relay zones of relay station 200 is determined by base station 100, but the present invention is not limited to this form. As another example, wireless NW management server 500 may make this determination. This form can be realized by base station 100 and relay station 200 reporting the number of users or the load status to wireless NW management server 500, and network management unit 501 of wireless NW management server 500 determining the size of the relay zones for relay station 200 based on this information and reporting to base station 100.

As the wireless communication system according to the first exemplary embodiment, an example was described in which femto base station 300 acquires information relating to the relay zones of relay station 200 and preferentially assigns wireless resources that are used in communication with mobile terminal 400-3 to subframes that correspond to relay zones. However, the present invention is not limited to this form. As another example, femto base station 300 may, if the neighboring station is a relay station, preferentially assign wireless resources that are used in communication with mobile terminal 400-3 to subframes that come later.

As the wireless communication system according to the first exemplary embodiment, an example was described in which the start time of a wireless frame that is used by femto base station 300 is synchronized with the start time of wireless frames used by base station 100 and a relay station. However, the present invention is not limited to this form. As another example, femto base station 300 may take the start position of the relay zones of relay station 200 as the start position of its own wireless frames. For example, femto base station 300 may take the start position of wireless frames as the start timing of the DL relay zone or the end timing of the DL access zone of relay station 200. Accordingly, femto base station 300 is able to mitigate the interference between a downlink control signal (preamble. SFH, etc.) that is transmitted in the leading portion of a wireless frame and macrocell 2 and is able to improve the reception quality of the downlink control signal in mobile terminal 400-3.

Second Exemplary Embodiment

In the second exemplary embodiment, a modification of the above-described first exemplary embodiment is described.

In the wireless communication system according to the second exemplary embodiment, in addition to operations similar to the wireless communication system according to the first exemplary embodiment, the femto base station implements power control that differs in subframes that correspond to access zones and subframes that correspond to relay zones. This modification in the second exemplary embodiment both reduces interference of macrocells and femtocells and improves the performance of the wireless communication system.

The configuration of the wireless communication system according to the second exemplary embodiment is identical to that of the first exemplary embodiment shown in FIG. 1. In addition, the configurations of base station 100, relay station 200, femto base station 300, and wireless NW management server 500 of the wireless communication system according to the second exemplary embodiment are identical to those of the first exemplary embodiment shown in FIGS. 2 to 5.

In the wireless communication system according to the second exemplary embodiment, the operations when wireless NW management server 500 creates the neighboring station list of femto base station 300 are the same as the operations of the wireless communication system according to the first exemplary embodiment shown in FIG. 8.

Figure 9:
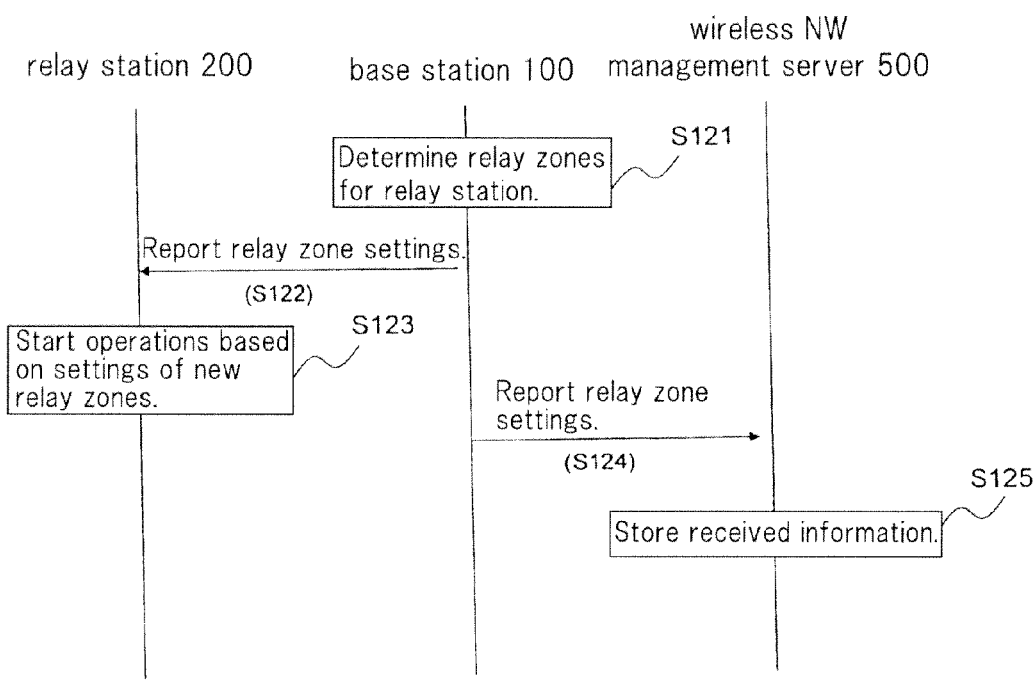
FIG. 9 is a sequence chart showing an example of the operations of the wireless communication system when a relay zone for relay station 200 is determined by base station 100 in the wireless communication system according to the first, second and third exemplary embodiments.

In the wireless communication system according to the second exemplary embodiment, the operations when the relay zones for relay station 200 are determined by base station 100 are the same as the operations of the wireless communication system according to the first exemplary embodiment shown in FIG. 9.

Figure 12:
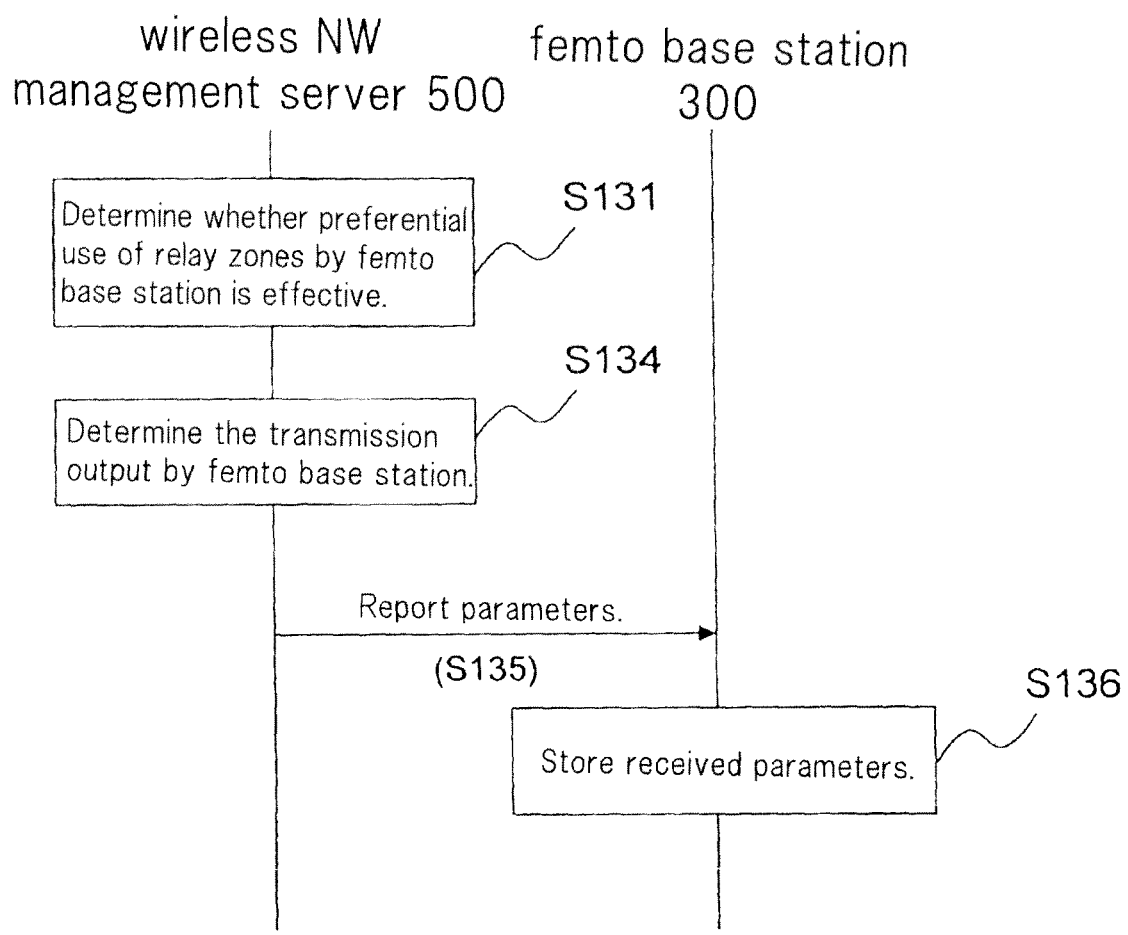
FIG. 12 is a sequence chart showing an example of the operations of the wireless communication system when wireless NW management server 500 reports to femto base station 300 information relating to the relay zone of relay station 200 of femto base station 300 in the wireless communication system according to the second exemplary embodiment.

In the wireless communication system according to the second exemplary embodiment, the operations when wireless NW management server 500 reports to femto base station 300 information relating to the relay zones of neighboring stations of femto base station 300 (relay station 200 in the case of the present exemplary embodiment) as shown in FIG. 12 differ in part from the operations of the wireless communication system according to the first exemplary embodiment shown in FIG. 10.

The points in the second exemplary embodiment that differ from the first exemplary embodiment are next described with reference to FIG. 12.

Following Step S31, network management unit 501 of wireless NW management server 500 selects the values of (A) and (B) to be below those that femto base station 300 is to use (Step S134). These values may be provided to network management unit 501 in advance, or may be calculated based on information collected from base station 100 and relay station 200 and obtained in Step S124.

(A) The transmission output in subframes that correspond to DL access zones of relay station 200

(B) The transmission output in subframes that correspond to DL relay zones of relay station 200 More specifically, if the transmission outputs in the access zones or relay zones of relay station 200 and base station 100 that is the higher-order station of relay station 200 is included in a message that is transmitted in Step S124 as described hereinabove, these values should be used to determine (A) and (B) to suppress interference with the signal transmitted by relay station 200 or base station 100. Typically, (B) is set to a greater value than (A).

In Step S135, network management unit 501 of wireless NW management server 500 transmits, in addition to parameters that were communicated in Step S132 of the first exemplary embodiment, (A) and (B) that are the transmission powers to be used by femto base station 300 that was selected in Step S134 as parameters to femto base station 300 as parameters (Step S135).

In Step S136, interference reduction processor 304 of femto base station 300, in addition to the operations realized in Step S133 of the first exemplary embodiment, sets (A) and (B) that are the transmission powers that femto base station 300 is to use and that were communicated in Step S135 in wireless MAC processor 302. Wireless MAC processor 302 of femto base station 300 then implements control of wireless IF unit 303 such that the transmission output in subframes that correspond to the DL access zones of relay station 200 and the transmission output in subframes that correspond to the DL relay zones of relay station 200 become the values (A) and (B) that were reported in Step S132.

As described hereinabove, according to the wireless communication system according to the second exemplary embodiment, femto base station 300, by acquiring the settings of relay zones used by relay station 200 that is a neighboring station and changing the transmission powers in subframes that correspond to the access zones and subframes that correspond to relay zones, both reduces the interference among macrocells 1, macrocells 2, and femtocells 3 and improves the performance of the system.

This effect is obtained because the transmission power of femto base station 300 is suppressed such that interference upon macrocell 1 and macrocell 2 decreases in subframes that correspond to DL access zones while in subframes that correspond to DL relay zones, taking into consideration the relatively small effect upon macrocell 1 and macrocell 2 enables increasing the transmission power of femto base station 300. By raising the transmission power of femto base station 300 in subframes that correspond to DL relay zones, MCS (Modulation and Coding Scheme) that has higher efficiency can be used between femto base station 300 and mobile terminal 400-3 and the performance of the system can be improved.

As the wireless communication system according to the second exemplary embodiment, an example was shown in which femto base station 300 uses different transmission powers in subframes that correspond to DL access zones and subframes that correspond to DL relay zones. However, the present invention is not limited to this form. As another example, femto base station 300 may use different estimated interference amounts in subframes that correspond to UL access zones and subframes that correspond to UL relay zones to implement transmission power control of mobile terminal 400-3. This can be realized by femto base station 300 either calculating estimated interference amounts for each of subframes that correspond to UL access zones and subframes that correspond to UL relay zones or by using each of the values that have been set in advance.

As the wireless communication system according to the second exemplary embodiment, an example was shown in which network management unit 501 of wireless NW management server 500 selects the transmission powers that femto base station 300 is to use in subframes that correspond to DL access zones and subframes that correspond to DL relay zones. However, the present invention is not limited to this form. As another example, femto base station 300, base station 100, or relay station 200 may perform this selection. This form can be realized by communicating the information necessary for making a selection among the devices.

Third Exemplary Embodiment

In the third exemplary embodiment, a modification of the above-described first exemplary embodiment is described.

In the first exemplary embodiment, a femto base station reduces interference by preferentially using subframes that correspond to relay zones in communication with a mobile terminal when the femto base station is operating in the area of a relay station as shown in FIG. 1.

Figure 13:
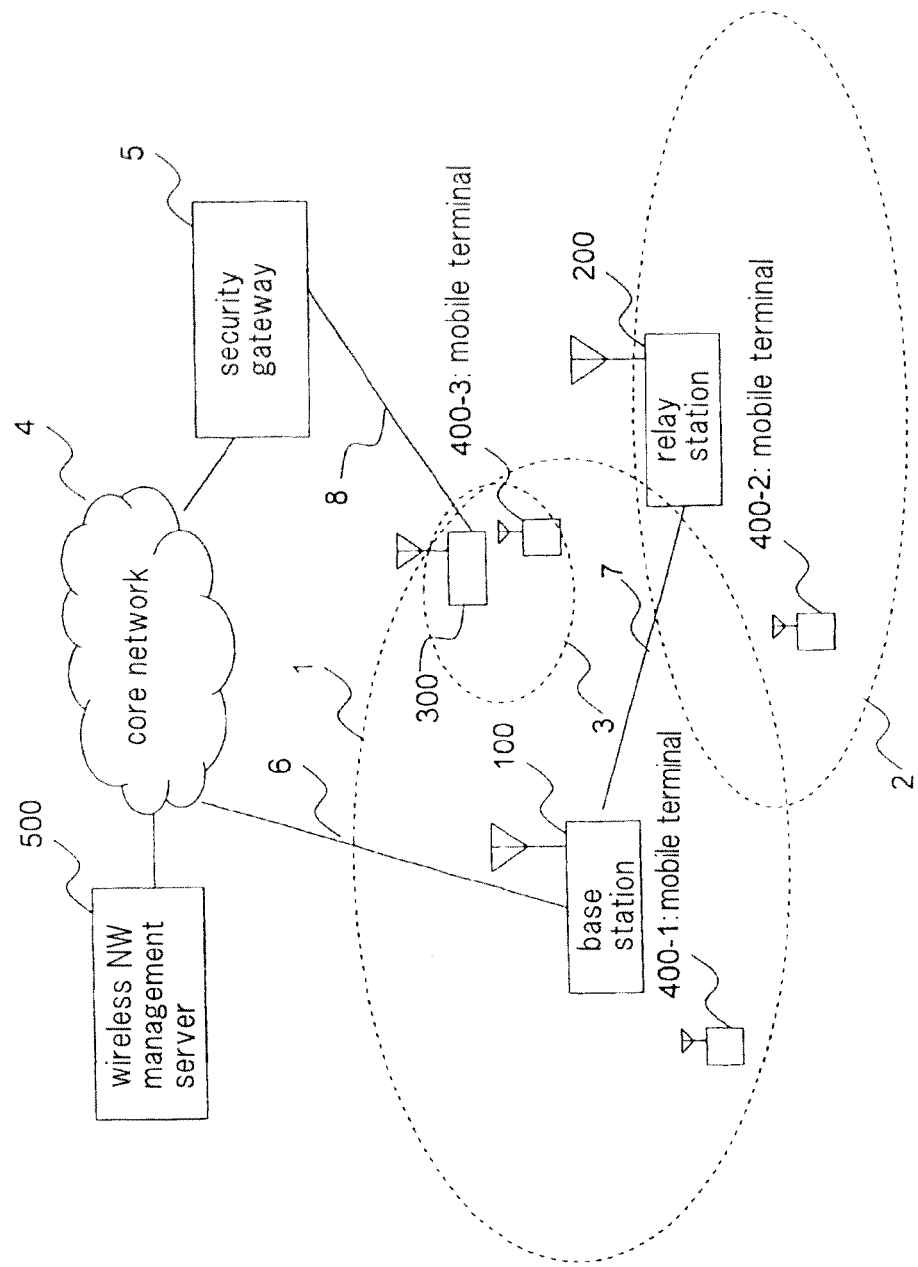
FIG. 13 shows the configuration of the wireless communication system according to the third exemplary embodiment of the present invention.

In contrast, in the wireless communication system according to the third exemplary embodiment, a femto base station reduces interference by preferentially using subframes that correspond to relay zones in communication with a mobile terminal when the femto base station is operating in the area of a base station as shown in FIG. 13.

In this case, there is potential that inference with communication may occur between femto base station 300 and mobile terminal 400-3 and with communication between base station 100 and relay station 200 in subframes that correspond to DL relay zones. In addition, there is also potential that inference with communication may occur between communication between femto base station 300 and mobile terminal 400-3 and with communication between base station 100 and mobile terminal 400-1. As a result, in the third exemplary embodiment, determining whether or not the preferential use by femto base station of subframes that correspond to relay zones is effective requires additional information apart from the information that was used in the determination in the first exemplary embodiment.

The difference between the wireless communication system according to the third exemplary embodiment that is shown in FIG. 13 and the wireless communication system according to the first exemplary embodiment shown in FIG. 1 is the disposition of femto base station 300 in macrocell 1 that is serviced by base station 100. The configuration of the wireless communication system according to the third exemplary embodiment is otherwise identical to that of the first exemplary embodiment, and redundant explanation is therefore omitted.

The configurations of base station 100, relay station 200, femto base station 300, and wireless NW management server 500 of the wireless communication system according to the third exemplary embodiment are identical to those of the first exemplary embodiment shown in FIGS. 2 to 5.

In the wireless communication system according to the third exemplary embodiment, the operations at the time that wireless NW management server 500 creates the neighboring station list of femto base station 300 are the same as the operations of the wireless communication system according to the first exemplary embodiment shown in FIG. 8.

In the wireless communication system according to the third exemplary embodiment, the operations at the time that the relay zones for relay station 200 are determined by base station 100 are the same as the operations of the wireless communication system according to the first exemplary embodiment shown in FIG. 9 with the exception of the points to be described hereinbelow.

In Step S124, higher-order layer processor 101 of base station 100 is assumed to further include either both or one of the following items of information in the message that is transmitted to wireless NW management server 500:

whether base station 100 also uses relay zones in communication with mobile terminal 400-1 whether base station 100 uses an interference avoidance technique in relay zones in communication with relay station 200

One example of an interference avoidance technique is beam forming.

In the wireless communication system according to the third exemplary embodiment, the operations at the time that wireless NW management server 500 reports to femto base station 300 information relating to the relay zones of neighboring stations of femto base station (relay station 200 in the case of the present exemplary embodiment) are the same as the operations of the wireless communication system according to the first exemplary embodiment shown in FIG. 10, with the exception of points to be described below.

In Step S131, network management unit 501 of wireless NW management server 500 determines whether the preferential use of relay zones by femto base station 300 is effective (Step S131).

As one example of this determination method, the preferential use of relay zones by femto base station 300 may be determined as effective when a base station that is using relay zones (this pertains to base station 100 in the present exemplary embodiment) is on the neighboring station list of femto base station 300.

As another example of the method of determination, the effectiveness of the preferential use of relay zones by femto base station 300 can be determined when a base station that is using relay zones is included in the result of scanning neighboring stations of femto base station 300, and moreover, according to the results of comparing either or both of the RSSI (Received Signal Strength Indicator) and SINR (Signal-To-Interference and Noise Power Ratio) of base station 100 at femto base station 300 with a predetermined threshold value.

Depending on the system in which the configuration and operations of the present exemplary embodiment have been applied, in some cases the preferential use of relay zones by femto base station 300 should be determined as effective if the RSSI or SINR surpasses a threshold value, and in other cases the preferential use of relay zones by femto base station 300 should be determined as effective if the RSSI or SINR falls below a threshold value.

Still further, network management unit 501 may take the non-use of relay zones by base station 100 in communication with mobile terminal 400-1 as an additional determination condition. For example, if base station 100 does not use relay zones in communication with mobile terminal 400-1, interference in relay zones is unlikely to occur, whereby the preferential use of relay zones by femto base station 300 may be determined as effective.

Network management unit 501 may also take the use by base station 100 of an interference avoidance technique such as beam forming in communication with relay station 200 in relay zones as an additional determination condition. For example, if base station 100 uses an interference avoidance technique such as beam forming in communication with relay station 200 in relay zones, the occurrence of interference in relay zones can be considered unlikely, whereby the preferential use of relay zones by femto base station 300 can be determined as effective.

After the execution of Step S133, wireless MAC processor 302 of femto base station 300 may measure the channel quality in each of subframes that correspond to access zones and subframes that correspond to relay zones based on information of relay zones that was reported, and by comparing the two, verify whether the preferential use of relay zone areas is effective. Wireless MAC processor 302 of femto base station 300 may then execute the process of assigning wireless resources to mobile terminal 400-3 that was described using FIG. 11 only when the preferential use of the relay zone area has been determined as effective as a result of verification.

The measurement of channel quality may be carried out by wireless IF unit 303 of femto base station 300 or may be carried out by wireless IF unit of mobile terminal 400-3. If the wireless IF unit of mobile terminal 400-3 performs measurement of channel quality, wireless MAC processor 302 of femto base station 300 can learn the channel quality by transmitting to mobile terminal 400-3 a measurement instruction message that designates the measurement target area and then by receiving the results.

Figure 11:
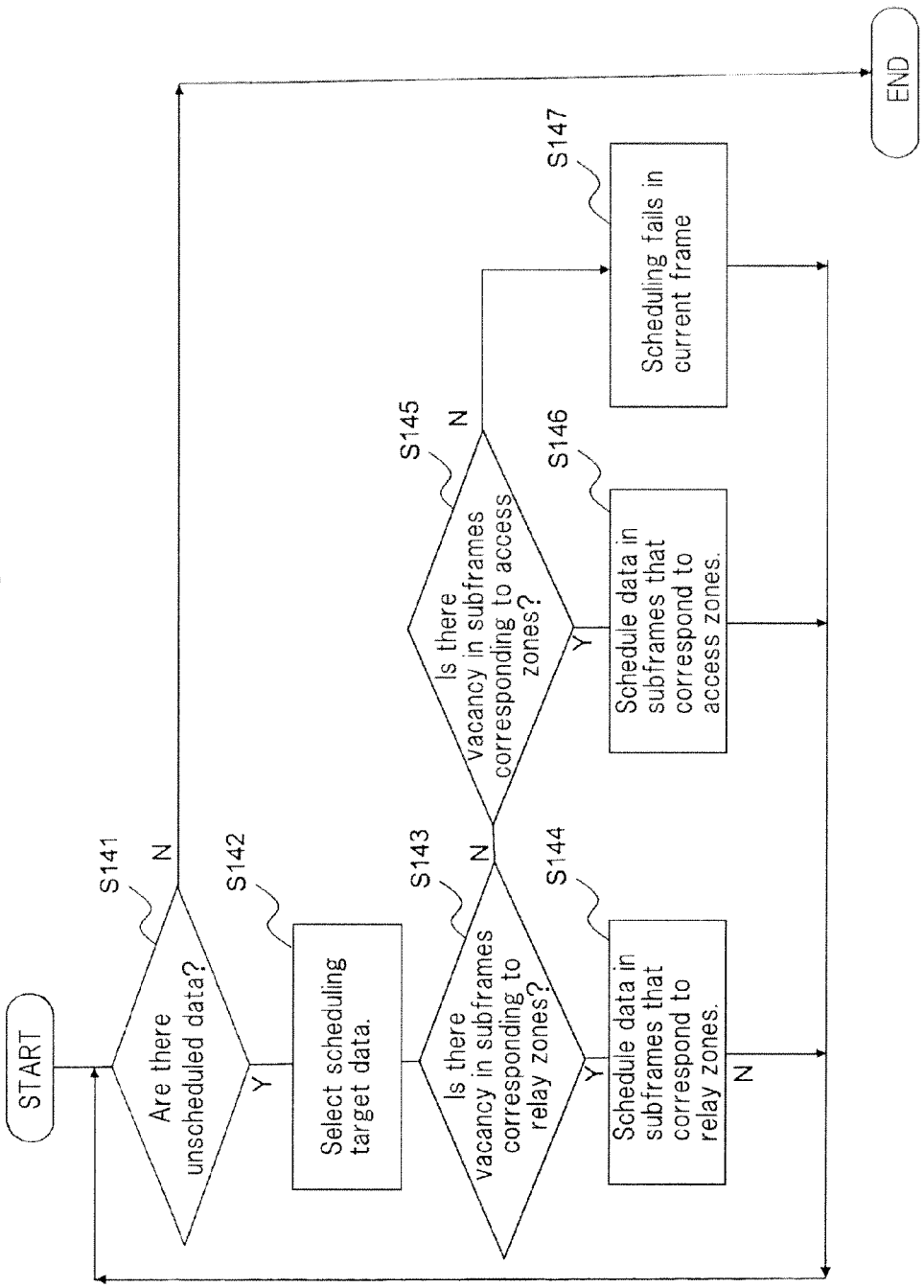
FIG. 11 is a flow chart showing an example of the operations of femto base station 300 when femto base station 300 carries out assignment of wireless resources for communication to mobile terminal 400-3 in the wireless communication system according to the first and third exemplary embodiments.

In the wireless communication system according to the third exemplary embodiment, the operations of femto base station 300 at the time that femto base station 300 assigns wireless resources for communication to mobile terminal 400-3 are the same as the operations of the wireless communication system according to the first exemplary embodiment shown in FIG. 11.

As described hereinabove, according to the wireless communication system according to the third exemplary embodiment, even when femto base station 300 is present in the area of base station 100, femto base station 300 is able to mitigate interference between macrocell 1, macrocell 2, and femtocell 3 by preferentially using the wireless resources of subframes that correspond to relay zones in communication with mobile terminal 400-3.

As the wireless communication system according to the third exemplary embodiment, an example was shown in which femto base station 300 preferentially uses the wireless resources of subframes that correspond to relay zones in communication with mobile terminal 400-3, but the present invention is not limited to this form. As another example, femto base station 300 may further implement transmission power control such that the transmission power differs for subframes that correspond to access zones and subframes that correspond to relay zones, as in the second exemplary embodiment.

As the wireless communication system according to the third exemplary embodiment, an example was shown in which relay station 200 is present and relay zones are set and used between base station 100 and relay station 200, but the present invention is not limited to this form. As another example, base station 100 may set relay zones virtually in a case in which relay station 200 is not present. According to this form, interference between macrocell 1 and femtocell 3 can be reduced by the preferential use of relay zones in femtocell 3 as shown in each of the exemplary embodiments of the present invention even when relay station 200 is not present under the jurisdiction of base station 100.

This effect can be realized as follows. Base station 100 to which relay station 200 is not connected constitutes a virtual relay zone and reports to wireless NW management server 500 (Step S124).

At this time, base station 100 may additionally report information indicating that this relay zone is virtual. In this case, network management unit 501 of wireless NW management server 500 may use the fact that base station 100 is a virtual relay zone as an additional determination condition in Step S131.

Base station 100 preferentially assigns wireless resources that are used in communication with mobile terminal 400-1 in an area other than a virtual relay zone (a virtual access zone).

Fourth Exemplary Embodiment

In the first to third exemplary embodiments, examples were shown in which the present invention is applied to a WiMAX system based on IEEE 802.16m standards. However, the present invention is not limited to this form and may be applied to a wireless communication system based on other standards. For example, the present invention may be applied to a wireless communication system that conforms to the standards of the 3GPP (Third Generation Partnership Project).

In the fourth exemplary embodiment, a case is described in which the technology that was applied in the first exemplary embodiment is applied in a 3GPP LTE (Long Term Evolution) system or LTE-Advanced system.

The wireless communication system according to the fourth exemplary embodiment is of a configuration that includes the following correspondence relations with respect to the configuration of the first exemplary embodiment shown in FIG. 1.

Figure 14:
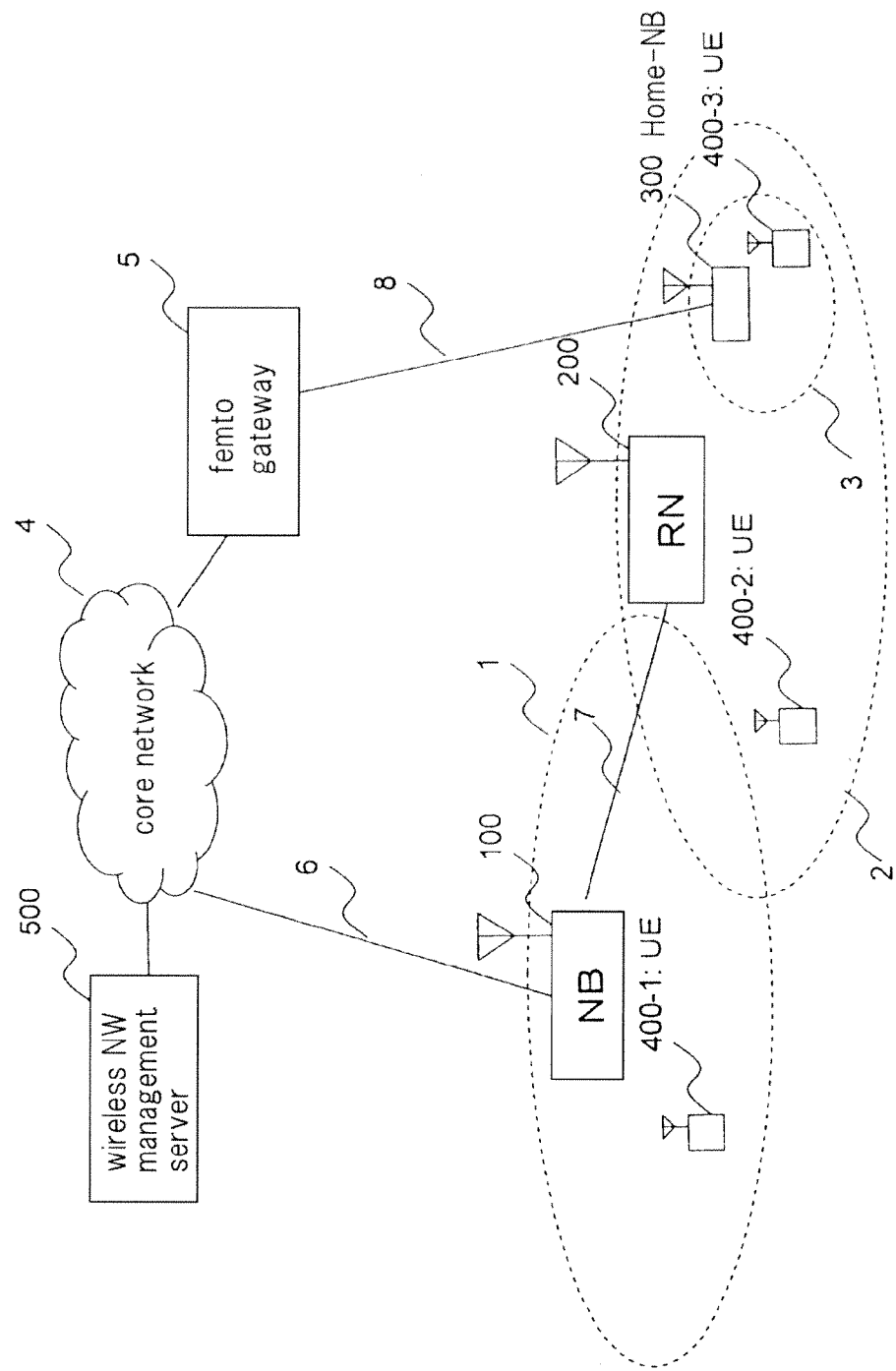
FIG. 14 shows the configuration of the wireless communication system according to the fourth exemplary embodiment of the present invention.

Base station 100 of FIG. 1 is an NB (NodeB), eNodeB (eNB), macro-NB, or macro-eNB in FIG. 14.

Relay station 200 in FIG. 1 is an RN (Relay Node) in the present exemplary embodiment.

Femto base station 300 of FIG. 1 is a Home-NB or Home-eNB in the present exemplary embodiment.

Mobile terminals 400-1-3 in FIG. 1 are UE (User Equipment) in the present exemplary embodiment.

Security gateway 5 in FIG. 1 is a femto-gateway in the present exemplary embodiment.

FIG. 14 shows the configuration of the wireless communication system according to the fourth exemplary embodiment. In FIG. 14, an example is shown in which the technology that was applied in the first exemplary embodiment is applied to a 3GPP LTE. The wireless communication system of the present exemplary embodiment includes NB 100, RN 200, and Home-NB 300, NB 100, RN 200, and Home-NB 300 each make up macrocell 1, macrocell 2, and femtocell 3, respectively, and perform bidirectional wireless communication with mobile terminal 400-1, mobile terminal 400-2, and mobile terminal 400-3, respectively.

The relay zone for relay station 200 in the first exemplary embodiment is subframes used for communication by RN 200 with NB 100 in the wireless communication system according to the fourth exemplary embodiment. These subframes may be, for example, MBMS (Multimedia Broadcast and Multicast Service) Single Frequency Network (MBSFN) subframes of base station 100.

The operations of the wireless communication system according to the fourth exemplary embodiment are similar to the operations of the wireless communication system according to the first exemplary embodiment that were explained using FIGS. 8-11. The correspondence relations of each of the devices are as described hereinabove.

The wireless communication system according to the fourth exemplary embodiment may include execution of the following operations in addition to the operations of the first exemplary embodiment.

In the wireless communication system according to the fourth exemplary embodiment, wireless NW management server 500 may use RSRP (Reference Signal Received Power) and RSRQ (Reference Signal Received Quality) as measurement parameters that are used at the time of creating the neighboring station list of Home-NB 300.

Although description has been presented with regard to various exemplary embodiments of the present invention, the present invention is not limited to only these exemplary embodiments, and these exemplary embodiments may be used in combination or portions of the configurations of these exemplary embodiments may be altered within the scope of the technological concepts of the present invention.

This application claims the benefits of priority based on Japanese Patent Application No. 2009-295153 for which application was submitted on Dec. 25, 2009 and incorporates by citation all of the disclosures of that application.

The invention claimed is:

1. A wireless communication system, comprising:
a first communication station that connects with a higher-order station or a lower-order station in a communication path of a multi-hop wireless communication and that carries out a wireless communication with a mobile terminal in access areas in predetermined wireless resources that differ from relay areas for wireless communication with said higher-order station or said lower-order station in the wireless resources;
a second communication station that constitutes a communication path that differs from the communication path of said multi-hop wireless communication, that is configured to use said wireless resources to carry out wireless communication with a mobile terminal, and that acquires information indicating said relay areas in the wireless resources; and
a management server that manages said first communication station and said second communication station,
wherein said management server reports information indicating said relay areas to said second communication station,
wherein said second communication station detects the first communication station that is present in its own vicinity and reports to said management server,
wherein said first communication station or a higher-order station of the first communication station reports to said management server information indicating relay areas in the first communication station, and
wherein said management server reports information indicating relay areas in the first communication station to the second communication station in whose vicinity the first communication station is present.

2. The wireless communication system as set forth in claim 1, wherein a base station that comprises said first communication station or a higher-order station of the first communication station determines relay areas and access areas in the first communication station and reports information indicating the relay areas to said management server.

3. The wireless communication system as set forth in claim 1, wherein said management server further reports to said second communication station a value of transmission power that said second communication station uses in said relay areas and a value of transmission power that said second communication station uses in said access areas, and
wherein said second communication station controls values of the transmission powers of said relay areas and controls said access areas to said values that are reported from said management server.

4. A wireless communication system, comprising:
a first communication station that connects with a higher-order station or a lower-order station in a communication path of a multi-hop wireless communication and that carries out a wireless communication with a mobile terminal in access areas in predetermined wireless resources that differ from relay areas for wireless communication with said higher-order station or said lower-order station in the wireless resources; and
a second communication station that constitutes a communication path that differs from the communication path of said multi-hop wireless communication, that is configured to use said wireless resources to carry out wireless communication with a mobile terminal, and that acquires information indicating said relay areas in the wireless resources,
wherein said second communication station preferentially uses said relay areas over said access areas to carry out wireless communication with a mobile terminal,
wherein, when scheduling target data are present, said second communication station arranges the data in relay areas if there is a vacancy in the relay areas in a frame, arranges the data in access areas if there is no vacancy in the relay areas, and if there is a vacancy in the access areas of said frame, and does not arrange the data in said frame if there is no vacancy in either of the relay areas and the access areas.

5. A base station that forms a cell inside or in a vicinity of a cell of a communication station, that connects with a higher-order station or a lower-order station in a communication path of a multi-hop wireless communication, and that performs a wireless communication with a mobile terminal in access areas in predetermined wireless resources that differ from relay areas for wireless communication with said higher-order station or said lower-order station in the wireless resources, and that constitutes a communication path that differs from the communication path of said multi-hop wireless communication, said base station comprising:
a wireless communication processing unit that uses said wireless resources to carry out wireless communication with a mobile terminal; and
a control unit that acquires information indicating said relay areas in said wireless resources,
wherein a management server that manages said communication station and said base station is present,
wherein information that indicates said relay areas is reported from said management server to said base station,
wherein said wireless communication processing unit of said base station detects and reports to said management server a communication station that is present in a vicinity of said base station,
wherein said communication station or a higher-order station of said communication station reports to said management server information that indicates relay areas in said communication station, and wherein said management server reports information that indicates relay areas in the communication station to the base station in whose vicinity a communication station is present.

6. The base station as set forth in claim 5, wherein a non-femto base station that comprises said communication station or that is a higher-order station of the communication station determines relay areas and access areas in the communication station and reports information indicating the relay areas to said management server.

\* \* \* \* \*